United States Patent
Yoon et al.

(10) Patent No.: US 9,201,425 B2
(45) Date of Patent: Dec. 1, 2015

(54) HUMAN-TRACKING METHOD AND ROBOT APPARATUS FOR PERFORMING THE SAME

(71) Applicant: Electronics and Telecommunications Research Institute, Daejeon (KR)

(72) Inventors: Young Woo Yoon, Daejeon (KR); Do Hyung Kim, Daejeon (KR); Woo Han Yun, Daejeon (KR); Ho Sub Yoon, Daejeon (KR); Jae Yeon Lee, Daejeon (KR); Jae Hong Kim, Daejeon (KR); Jong Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

(21) Appl. No.: 14/021,983

(22) Filed: Sep. 9, 2013

(65) Prior Publication Data

US 2014/0107842 A1 Apr. 17, 2014

(30) Foreign Application Priority Data

Oct. 16, 2012 (KR) ........................ 10-2012-0114537

(51) Int. Cl.
| | | |
|---|---|---|
| G05B 15/00 | (2006.01) | |
| G05B 19/00 | (2006.01) | |
| G05D 1/02 | (2006.01) | |
| G06K 9/00 | (2006.01) | |
| G06T 7/20 | (2006.01) | |

(52) U.S. Cl.
CPC ............ *G05D 1/0231* (2013.01); *G05D 1/0248* (2013.01); *G06K 9/00342* (2013.01); *G06T 7/20* (2013.01); *G06T 2207/10024* (2013.01); *G06T 2207/10028* (2013.01); *G06T 2207/30196* (2013.01)

(58) Field of Classification Search
CPC combination set(s) only.
See application file for complete search history.

(56) References Cited

U.S. PATENT DOCUMENTS

| | | |
|---|---|---|
| 2010/0134632 A1 | 6/2010 | Won et al. |
| 2011/0080336 A1 | 4/2011 | Leyvand et al. |
| 2011/0211754 A1 | 9/2011 | Litvak et al. |

*Primary Examiner* — Bhavesh V Amin

(57) ABSTRACT

Provided are a human-tracking method and a robot apparatus. The human-tracking method includes receiving an image frame including a color image and a depth image, determining whether user tracking was successful in a previous image frame, and determining a location of a user and a goal position to which a robot apparatus is to move based on the color image and the depth image in the image frame, when user tracking was successful in the previous frame. Accordingly, a current location of the user can be predicted from the depth image, user tracking can be quickly performed, and the user can be re-detected and tracked using user information acquired in user tracking when detection of the user fails due to obstacles or the like.

7 Claims, 4 Drawing Sheets

HUMAN-TRACKING METHOD AND ROBOT APPARATUS FOR PERFORMING THE SAME

CLAIM FOR PRIORITY

This application claims priority to Korean Patent Application No. 10-2012-0114537 filed on Oct. 16, 2012 in the Korean Intellectual Property Office (KIPO), the entire contents of which are hereby incorporated by reference.

BACKGROUND

1. Technical Field

Example embodiments of the present invention relate in general to human-tracking technologies, and more specifically, to a human-tracking method using an RGB-depth camera and a robot apparatus for performing the same.

2. Related Art

A robot tracking a user based on camera images, which is one method of human-robot interaction, is an important function of a moving robot. The robot tracking the user based on images is a function in which, in a situation where there is no map information about current surroundings, the user may simply walk without a separate device and thereby cause the robot to track.

Such a user-tracking robot system may be created in a variety of methods. A method used in the prior art is a method of tracking legs of a user using a laser range finder (LRF). The LRF outputs omnidirectional depth information parallel to a sensor in a horizontal direction. In the method of tracking legs of the user using the LRF, a position of the legs is estimated from the depth information, and the position is tracked using a particle filter, a Kalman filter, or the like. Another method used in the prior art is a method of detecting a face, an upper body, or a whole body. A robot may detect a face, an upper body, or a whole body from RGB camera images and move in a direction in which a user is located.

Among the methods of the prior art, the method using the LRF has a disadvantage that an LRF sensor is expensive even though it efficiently operates indoors and outdoors. In addition, the method of detecting the face, the upper body, or the whole body has disadvantages that an immediate reaction of the robot is impossible due to a slow detection speed, and detection is likely to fail.

SUMMARY

Accordingly, example embodiments of the present invention are provided to substantially obviate one or more problems due to limitations and disadvantages of the related art.

Example embodiments of the present invention provide a human-tracking method in which a robot can stably track a user.

Example embodiments of the present invention also provide a robot apparatus which can perform a human-tracking method of stably tracking a user.

In some example embodiments, a human-tracking method includes: receiving an image frame including a color image and a depth image, determining whether user tracking was successful in a previous image frame, and determining a location of a user and a goal position to which a robot apparatus is to move based on the color image and the depth image in the image frame, when user tracking was successful in the previous frame.

Here, the determining of the location of the user and the goal position may include performing depth-filtering in a current image frame based on the location of the user successfully tracked in the previous image frame, performing color-based tracking in an image on which the depth-filtering is performed, acquiring the location of the user when user tracking is successful in the color-based tracking, and setting the location of the user as the goal position to which the robot apparatus is to move.

Also, the human-tracking method may further include detecting a user in the image frame and determining the location of the user and the goal position to which the robot apparatus is to move, when user tracking failed in the previous frame.

Here, the detecting a user in the image frame and determining the location of the user and the goal position to which the robot apparatus is to move, when user tracking failed in the previous frame, may include detecting at least one human being from the color image and the depth image and detecting the user based on color information and height information of the user from the detected at least one human being, and storing tracking information and determining the determined location of the user as the goal position to which the robot apparatus is to move, when detection succeeds.

Here, the color information of the user may be color information of the user generated when user tracking succeeds.

Also, the height information of the user may be height information estimated from at least one of a height of a camera, an angle of the camera, a field of view (FOV), and the location and depth of the user within the image frame, when user tracking succeeds.

Also, the human-tracking method may further include determining a most recently set goal position as the goal position to which the robot apparatus is to move, when detection fails.

In other example embodiments, a human-tracking robot apparatus includes: an input unit configured to provide a color image and a depth image about a user who is a tracking target, a control unit configured to track the user based on the provided color image and depth image, a storage unit configured to store the provided color image and depth image and information generated when tracking the user, and a movement platform unit configured to control movement to a location of the user tracked by the control unit.

Here, the control unit may receive an image frame including the color image and the depth image, determine whether user tracking was successful in a previous image frame, and determine the location of the user and a goal position to which the robot apparatus is to move based on the color image and the depth image in the image frame, when user tracking was successful.

Here, the control unit may perform depth-filtering in the image frame based on the location of the user successfully tracked in the previous image frame, perform color-based tracking in an image on which the depth-filtering is performed, store the location of the user and information of the user when user tracking succeeds, and set the location of the user as the goal position to which the robot apparatus is to move.

Also, the control unit may detect the user from the image frame and determine the location of the user and the goal position to which the robot apparatus is to move, when user tracking failed in the previous image frame.

Also, the control unit may detect at least one human being from the color image and the depth image, detect the user based on color information and height information of the user from the detected at least one human being, store tracking information when detection succeeds, and determine the detected location of the user as the goal position to which the robot apparatus is to move.

BRIEF DESCRIPTION OF DRAWINGS

These and other objects, features and advantages of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to example embodiments of the present invention set forth herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to a user tracking apparatus in which a robot may immediately react and stably track a user using a low-cost RGB-depth camera while considering situations in which the user is hidden behind obstacles, obstacle avoidance, and the like. That is, the present invention relates to an apparatus that combines user-tracking, obstacle avoidance, and user-detection systems, and performs a user-tracking process using the RGB-depth camera.

Figure 1:
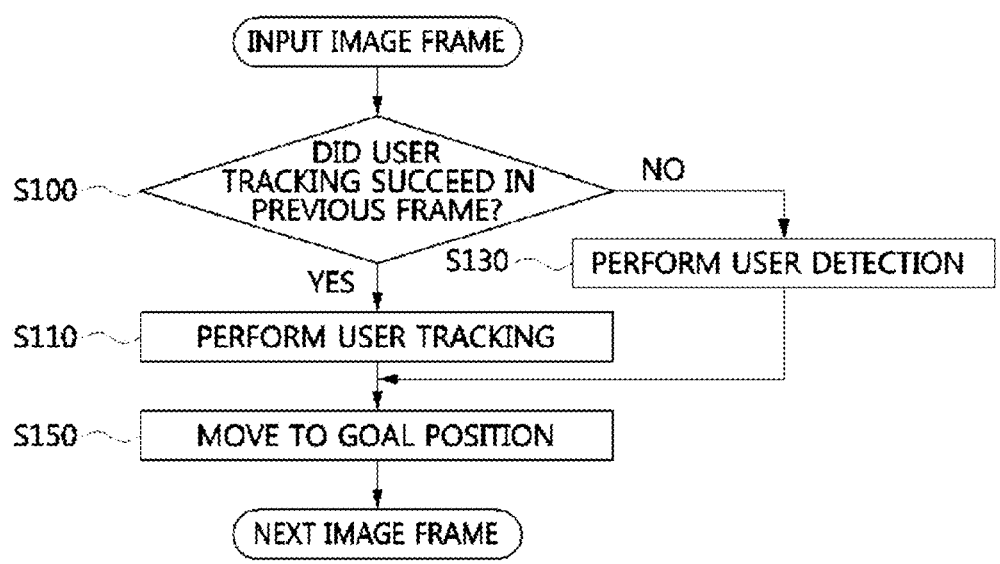
FIG. 1 is a brief flowchart illustrating a human-tracking process according to an embodiment of the present invention.

FIG. 1 is a brief flowchart illustrating a human-tracking process according to an embodiment of the present invention.

In FIG. 1, the human-tracking process is applied to each frame of an image photographed by the RGB-depth camera. Here, the RGB-depth camera is a camera that outputs general RGB and depth images, and for example, Microsoft Kinect, ASUS xTion, or the like may be used as the RGB-depth camera.

User tracking may be performed in a variety of methods. A variety of methods such as direct command input, voice recognition, gesture recognition, and the like are possible and can track a user who issues a command.

According to an embodiment of the present invention, it is assumed that a location of a user to start tracking within an image has been already recognized.

In operation S100, a human-tracking robot apparatus determines whether user tracking was successful in a previous image frame when a current image frame including a color image and a depth image is input. As described above, since it is assumed that the location of the user is already known when starting initial tracking, the determination result is that user tracking succeeds in an initial image frame for user tracking.

In operation S110, the human-tracking robot apparatus performs user tracking when user tracking was successful in the previous image frame including the initial image frame for user tracking. User tracking may include depth-filtering, color-based tracking, goal position setting, and the like.

In operation S150, the human-tracking robot apparatus moves to a goal position corresponding to a result of user tracking S110 after performing user tracking. The human-tracking robot apparatus detects obstacles in front and moves while avoiding the obstacles when the obstacles are detected in front.

In operation S130, the human-tracking robot apparatus performs user detection when user tracking failed in the previous image frame. The user detection may include head and shoulders detection, comparison between a detected person and a user, goal position setting, and the like.

In operation S150, the human-tracking robot apparatus moves to the goal position corresponding to a result of the user detection S130.

Figure 2:
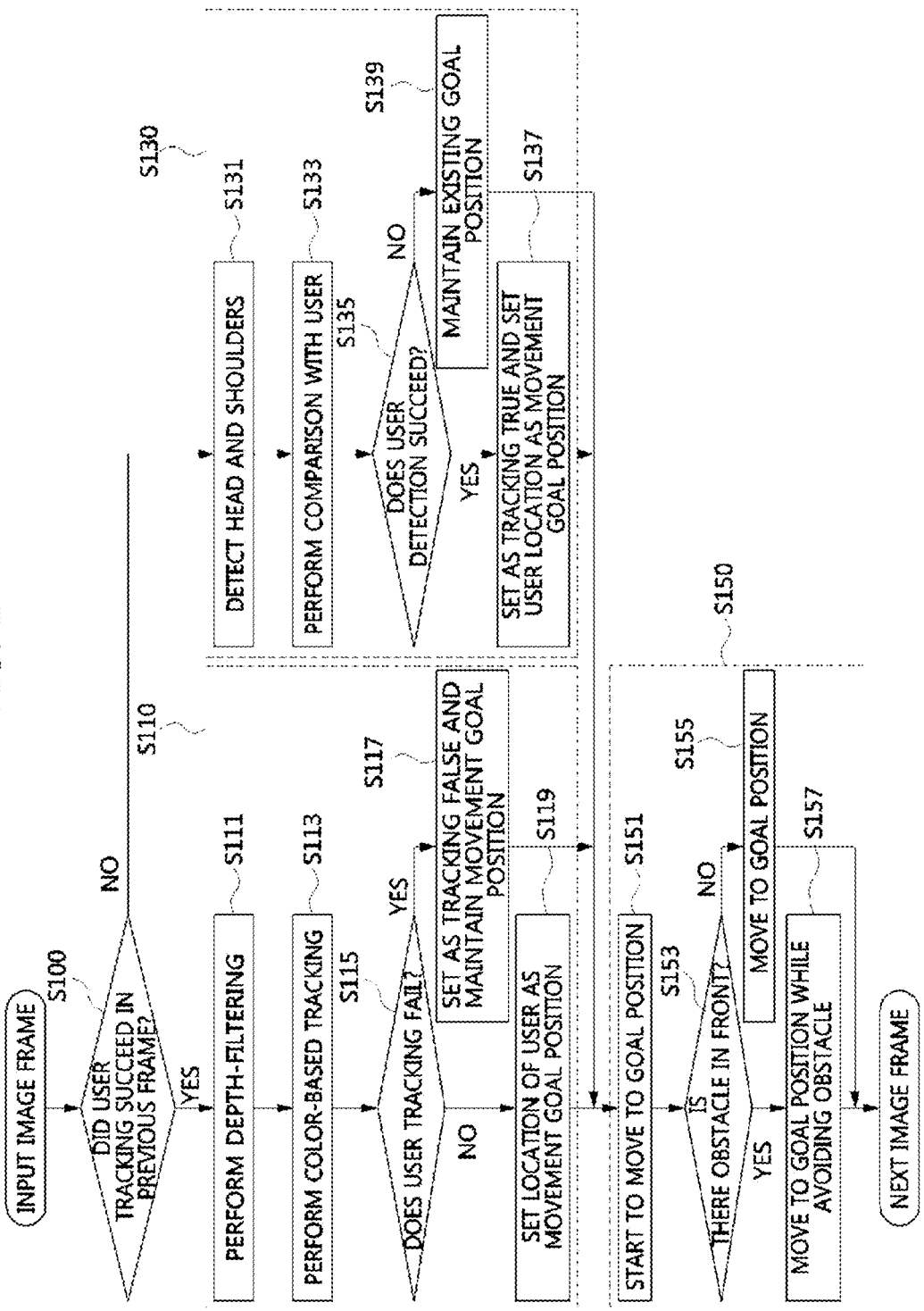
FIG. 2 is a detailed flowchart illustrating a human-tracking process according to an embodiment of the present invention.

FIG. 2 is a detailed flowchart illustrating a human-tracking process according to an embodiment of the present invention.

In operation S100, the human-tracking robot apparatus determines whether user tracking was successful in a previous image frame when a current image frame including a color image and a depth image is input.

In operation S111, the human-tracking robot apparatus performs depth-filtering when user tracking was successful in the previous image frame. Through the depth-filtering, only depths similar to a depth of a position at which the user has been located in the previous image frame remain in the current image frame, thereby helping to track a location of the user.

In operation S113, the human-tracking robot apparatus performs color-based tracking after the depth-filtering. Through the color-based tracking, a current location of the user may be tracked within a tracking region determined in the depth-filtering S111 performed based on the location of the user who is a tracking target in the previous image frame. Technologies for color-based tracking may include histogram back-projection and mean-shift tracking. The histogram back-projection is a method of extracting a region having a similar color to that of the tracking target, and has a disadvantage of the tracking target and a background being confused when the tracking target and the background have a similar color. Thus, by limiting a region of the user who is the tracking target based on the depth in operation S111, it is possible to reduce confusion caused by the background and the user having a similar color while having different depths.

Accordingly, after the depth-filtering based on the location of the user in the previous frame, the mean-shift tracking of the robot apparatus in a region in which the histogram back-projection has been performed is performed in a region having similar depth to the location of the user who is the tracking target, and having a similar color to the user, and therefore the mean-shift tracking may be rapidly and stably performed.

Here, since the tracking target is a human being and the human being generally has an upper body and a lower body which have different colors, tracking performance may be improved using a method of dividing and calculating the upper body and the lower body when generating a histogram.

In operation S115, the human-tracking robot apparatus calculates a matching score of colors in the color-based tracking, compares the calculation result and a predetermined value, and determines whether user tracking succeeds currently. For example, when the user is hidden behind an obstacle or moves to a position in which the user cannot be captured by a camera, user tracking may fail.

In operation S117, when user tracking fails based on the result of the determination of operation S115, the human-tracking robot apparatus sets tracking false and maintains the goal position as a most recently set goal position.

In operation S119, when user tracking succeeds based on the result of the determination of operation S115, the human-tracking robot apparatus records a location and information of the user, and sets the location of the user as the goal position.

Here, the recorded location of the user is used when performing depth-filtering in a next image frame, and the recorded information of the user is used to detect the user when user tracking fails.

In operation S151, the human-tracking robot apparatus attempts to move to the goal position corresponding to the result of user tracking. In operation S153, the human-tracking robot apparatus detects whether any obstacle exists in front for stable movement when moving to the goal position. Here, the detection of the obstacle uses a depth image.

Since a lower end portion of the depth image includes a ground portion, an obstacle may be determined present when an object having depth lower than a predetermined threshold value exists in a center lower end portion of the depth image, that is, when an object exists nearby.

In operation S155, the human-tracking robot apparatus simply rotates and moves in the goal direction when no obstacle is present based on the result of detection in operation S153. The rotation and movement of the robot apparatus are carried out by controlling each wheel of the robot apparatus. That is, by adjusting the speed of the robot apparatus in accordance with a distance between the goal position and the human-tracking robot apparatus using the RGB-depth camera, and by adjusting speeds of right and left wheels of the robot apparatus in accordance with a difference between a movement direction and orientation of the robot apparatus, the robot apparatus may move to the goal position.

In operation S157, when an obstacle is present based on the result of detection in operation S153, the human-tracking robot apparatus moves while avoiding the obstacle. As a method of avoiding the obstacle, for example, vector field histogram may be used.

In operation S131, when the result of determining in operation S100 whether user tracking was successful in the previous image frame indicates that user tracking failed, that is, when user tracking failed because the tracking target was hidden behind an obstacle or moved into a position where it could not be captured by the camera, the human-tracking robot apparatus performs head and shoulders detection. The head and shoulders detection is a process of re-detecting the lost user by detecting the head and shoulders of the upper body of the user. As a method of detecting the head and shoulders of the upper body of the user from the depth image, a method using two-dimensional (2D) edge detection and three-dimensional (3D) shape detection may be used.

In operation S131, all human beings existing in the image frame may be detected. Accordingly, it is necessary to select a user who is the tracking target among the detected human beings. Thus, in operation S133, the human-tracking robot apparatus compares the human beings detected in operation S131 with previously tracked user information. Here, the user information may use, for example, color information and height information. The color information and height information of the user can be stored every second while user tracking succeeds, and therefore the detected human beings and the previously tracked user may be compared.

Here, the height information of the user may be calculated using a height and angle of a camera installed in the robot apparatus, and a location and depth of the user within an image from field of view (FOV). However, since a resolution of the user height prediction is not high, this may be used only to remove candidates showing a large difference with the user height.

Here, in the detection of the user through comparison of color information, by dividing an upper body and a lower body of the user and then performing the detection of the user, detection performance can be enhanced.

In operation S135, the human-tracking robot apparatus determines user detection based on results of the comparison between the detected human beings and the user.

In operation S137, when the user who is the tracking target is successfully tracked based on results of the determination in operation S135, the human-tracking robot apparatus sets tracking true and sets the location of the user as the goal position to which the robot apparatus is to move.

In operation S139, when the user is not successfully tracked based on results of the determination in operation S135, the human-tracking robot apparatus maintains the goal position as a most recently set goal position.

In operation S151, the human-tracking robot apparatus attempts to move to the goal position corresponding to the result of the user detection.

When the user detection fails, a process of tracking the user may be repeatedly performed in a next image frame.

FIGS. 3A to 3D illustrate images for describing a user-tracking process according to an embodiment of the present invention.

Figure 3:
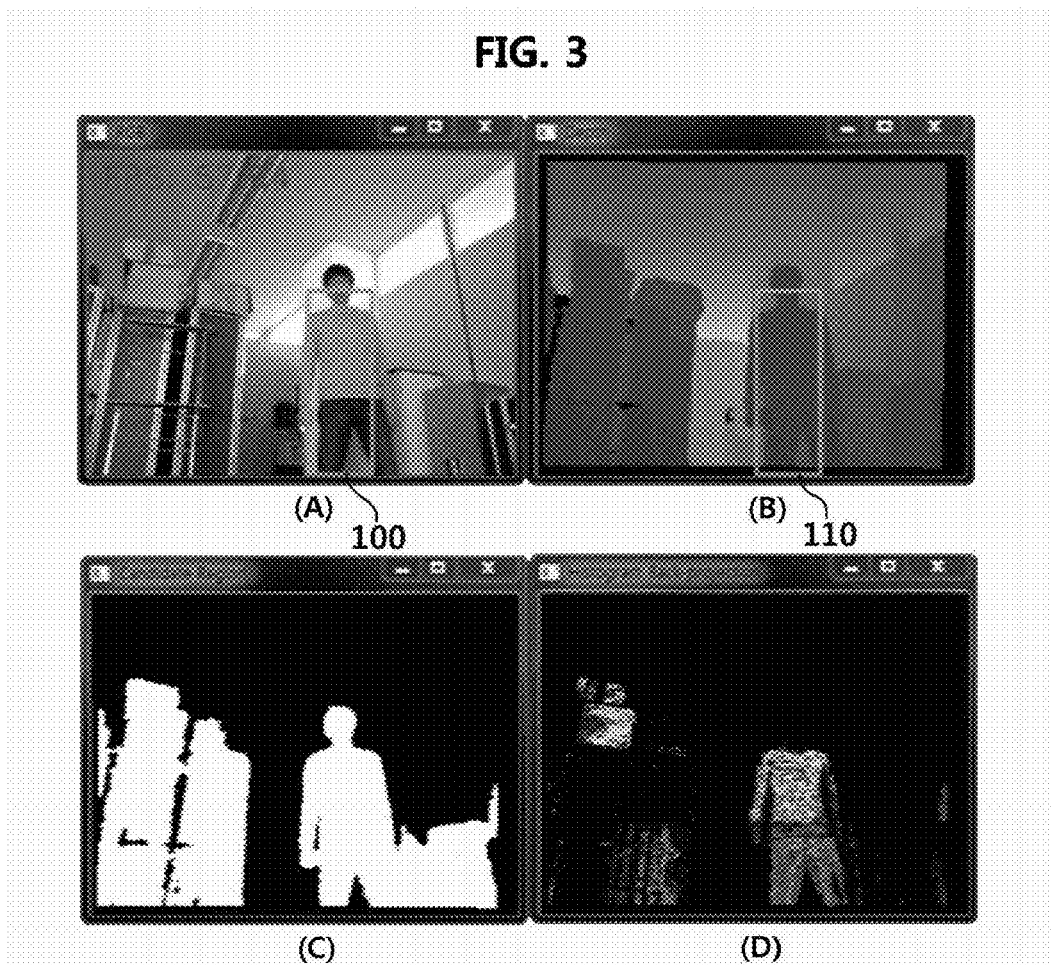
FIGS. 3A to 3D illustrate images for describing a user-tracking process according to an embodiment of the present invention.

FIGS. 3A to 3D show examples in which operations S111 to S113 of FIG. 2 are performed. FIG. 3A shows an RGB image and FIG. 3B shows a depth image. User regions 100 and 110 indicate regions of a user who was successfully tracked in a previous image frame. Depth of a currently predicted user location may be obtained by selecting a median value of values included in the user region 110 in the depth image. In FIG. 3C, an image obtained after performing depth-filtering, depth included in a range of user location ±K is represented by white color and depth included in the remaining regions is represented by black color, using a predetermined value K, at the depth of the currently predicted user location.

In FIG. 3D, an image obtained by performing histogram back-projection in operation S113, regions having similar colors may be extracted from an image at the depth of the currently predicted user location.

Figure 4:
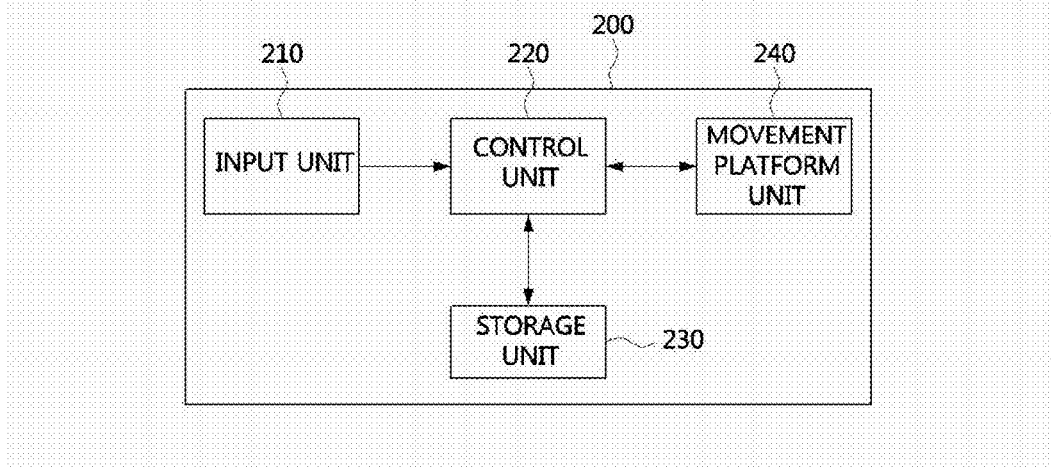
FIG. 4 is a block diagram of a configuration of a human-tracking robot apparatus according to another embodiment of the present invention.

FIG. 4 is a block diagram of a configuration of a human-tracking robot apparatus according to another embodiment of the present invention.

The human-tracking robot apparatus includes at least one of an input unit 210, a control unit 220, a storage unit 230, and a movement platform unit 240.

The input unit 210 provides a color image and a depth image for performing human tracking, and for example, Microsoft Kinect, ASUS xTion, or the like may be used as an RGB-depth camera.

The control unit 220 receives the color image and the depth image from the input unit 210, and determines whether user tracking was successful in a previous image frame when a current image frame is input.

When user tracking was successful in the previous image frame, the control unit 220 performs depth-filtering, and performs color-based tracking that tracks a current location of the user within a tracking region that is determined in the depth-filtering performed based on the location of the user who is the tracking target in the previous image frame after the depth-filtering.

The control unit 220 calculates a matching score of colors in the color-based tracking, compares the calculation result and a predetermined value, and determines whether user tracking succeeds currently. Here, when user tracking fails based on the determination result, the control unit 220 sets tracking false and maintains a goal position as a most recently set goal position.

In addition, when user tracking succeeds based on the determination result, the control unit 220 records a location and information of the user and sets the location of the user as the goal position.

In addition, when user tracking failed in the previous image frame, the control unit 220 performs head and shoulders detection. In the head and shoulders detection, all human beings existing in the image frame are detected. Thus, the detected human being and the previously tracked user information are compared, and user detection may be determined based on the comparison result.

When the user who is the tracking target is successfully tracked based on the determination result, the control unit 220 sets tracking true and sets the location of the user as the goal position to which the robot apparatus is to move.

When the user is not successfully tracked based on the determination result, the control unit 220 maintains the goal position as a most recently set goal position.

In addition, the control unit 220 provides information to the movement platform unit 240 so that the human-tracking robot apparatus is moved to the goal position.

The control unit 220 attempts to move to the goal position corresponding to user tracking result and detects whether any obstacle exists in front using the depth image for stable movement. When no obstacle is present based on the detection, the human-tracking robot apparatus simply rotates and moves in the goal direction by providing information to the movement platform unit 240. The rotation and movement of the robot apparatus are carried out by controlling each wheel of the robot apparatus. That is, by adjusting the speed of the robot apparatus 200 in accordance with a distance between the user and the human-tracking robot apparatus 200 using the RGB-depth camera, and by adjusting the speeds of right and left wheels of the robot apparatus in accordance with a difference between a movement direction and orientation of the robot apparatus, the robot apparatus may move to the goal position.

When an obstacle is present based on the detection result, the control unit 220 provides information to the movement platform unit 240 so that the robot apparatus may move while avoiding the obstacle.

The storage unit 230 stores the color image and the depth image transmitted from the input unit, and stores information generated in a process of the control unit 220 performing user tracking.

The movement platform unit 240 provides a means for the robot apparatus to move, and may include, for example, a motor and wheels.

In the human-tracking robot apparatus 200 according to the above-described embodiment of the present invention, the input unit 210, the control unit 220, the storage unit 230, and the movement platform unit 240 are separately provided, but they may alternatively be integrally implemented as one or two modules.

Figure 5:
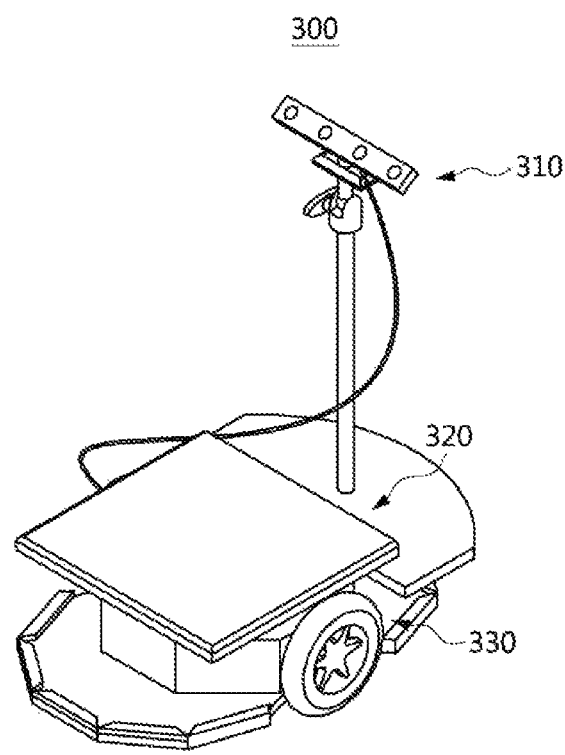
FIG. 5 is a block diagram of a human-tracking robot apparatus according to another embodiment of the present invention.

FIG. 5 is a block diagram of a human-tracking robot apparatus 300 according to another embodiment of the present invention.

In FIG. 5, as an example in which the present invention is actually configured, the human-tracking robot apparatus 300 includes an RGB-depth camera 310 as the input unit, a laptop computer 320 as the control unit and the storage unit, and a motor and wheels as the movement platform unit.

However, the human-tracking robot apparatus is not limited to the human-tracking robot apparatus 300 shown in FIG. 5, and may be configured in a variety of forms that perform the above-described human-tracking function.

As described above, according to embodiments of the present invention, the human-tracking method and the human-tracking robot apparatus can predict a current location of the user from the depth image photographed by the RGB-depth camera, rapidly perform user tracking, and rapidly re-detect the user using the user information obtained in user-tracking process when user tracking fails due to obstacles and the like, thereby tracking the user.

Accordingly, in a situation where there is no map information about current surroundings, the user can just walk without a separate device to cause the robot to track.

While the example embodiments of the present invention and their advantages have been described in detail, it should be understood that various changes, substitutions, and alterations may be made herein without departing from the scope of the invention as defined by the appended claims.

What is claimed is:

1. A human-tracking method performed by a robot apparatus, comprising:
   receiving an image frame including a color image and a depth image;
   determining whether user tracking was successful in a previous image frame;
   determining a location of a user and a goal position to which a robot apparatus is to move based on the color image and the depth image in the image frame, when user tracking was successful in the previous frame,
   controlling a movement of the robot apparatus; detecting the user in the image frame and determining the location of the user and the goal position to which the robot apparatus is to move, when user tracking failed in the previous frame; and
   determining a most recently set goal position as the goal position to which the robot apparatus is to move, when detection fails,
   wherein detecting the user includes:
   detecting at least one human being from the color image and the depth image and detecting the user based on color information and height information of the user from the detected at least one human being; and
   storing tracking information and determining the determined location of the user as the goal position to which the robot apparatus is to move, when detection succeeds.

2. The human-tracking method of claim 1, wherein the determining of the location of the user and the goal position includes:

performing depth-filtering in a current image frame based on the location of the user successfully tracked in the previous image frame;

performing color-based tracking in an image on which the depth-filtering is performed;

acquiring the location of the user when user tracking is successful in the color-based tracking; and setting the location of the user as the goal position to which the robot apparatus is to move.

3. The human-tracking method of claim 1, wherein the color information of the user is color information of the user generated when user tracking succeeds.

4. The human-tracking method of claim 1, wherein the height information of the user is height information estimated from at least one of a height of a camera, an angle of the camera, a field of view (FOV), and the location and depth of the user within the image frame, when user tracking succeeds.

5. A human-tracking robot apparatus comprising:

an input unit configured to provide a color image and a depth image about a user who is a tracking target;

a control unit configured to track the user based on the provided color image and depth image;

a storage unit configured to store the provided color image and depth image and information generated when tracking the user; and a movement platform unit configured to control movement of the robot apparatus to a location of the user tracked by the control unit wherein the control unit receives an image frame including the color image and the depth image, determines whether user tracking was successful in a previous image frame, and determines the location of the user and a goal position to which the robot apparatus is to move based on the color image and the depth image in the image frame when user tracking succeeds, and wherein the control unit detects the user from the image frame and determines the location of the user and the goal position to which the robot apparatus is to move, when user tracking failed in the previous image frame.

6. The human-tracking robot apparatus of claim 5, wherein the control unit performs depth-filtering in the image frame based on the location of the user successfully tracked in the previous image frame, performs color-based tracking in an image on which the depth-filtering is performed, stores the location of the user and information of the user when user tracking succeeds, and sets the location of the user as the goal position to which the robot apparatus is to move.

7. The human-tracking robot apparatus of claim 5, wherein the control unit detects at least one human being from the color image and the depth image, detects the user based on color information and height information of the user from the detected at least one human being, stores tracking information when detection succeeds, and determines the detected location of the user as the goal position to which the robot apparatus is to move.

\* \* \* \* \*